(12) United States Patent
Kim et al.

(10) Patent No.: US 10,223,269 B2
(45) Date of Patent: Mar. 5, 2019

(54) METHOD AND APPARATUS FOR PREVENTING BANK CONFLICT IN MEMORY

(71) Applicant: SAMSUNG ELECTRONICS CO., LTD., Suwon-si (KR)

(72) Inventors: Won-Sub Kim, Anyang-si (KR); Tai-song Jin, Seoul (KR); Do-hyung Kim, Hwaseong-si (KR); Seung-won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

(21) Appl. No.: 15/121,999

(22) PCT Filed: Feb. 26, 2015

(86) PCT No.: PCT/KR2015/001854
§ 371 (c)(1),
(2) Date: Aug. 26, 2016

(87) PCT Pub. No.: WO2015/130093
PCT Pub. Date: Sep. 3, 2015

(65) Prior Publication Data
US 2017/0068620 A1    Mar. 9, 2017

(30) Foreign Application Priority Data

Feb. 27, 2014   (KR) .................. 10-2014-0023707

(51) Int. Cl.
*G06F 12/08*       (2016.01)
*G06F 12/0844*   (2016.01)
(Continued)

(52) U.S. Cl.
CPC ........ *G06F 12/0844* (2013.01); *G06F 9/3824* (2013.01); *G06F 9/3851* (2013.01);
(Continued)

(58) Field of Classification Search
CPC .... G06F 13/372; G06F 13/376; G06F 13/161; G06F 13/1642; G06F 9/3851; G06F 9/52;
(Continued)

(56) References Cited

U.S. PATENT DOCUMENTS 6,385,708 B1   5/2002   Stracovsky et al.
7,093,059 B2   8/2006   Christenson
(Continued)

FOREIGN PATENT DOCUMENTS

CN   1383511 A   12/2002
CN   1519854 A    8/2004
(Continued)

OTHER PUBLICATIONS

Communication dated Sep. 22, 2017, from the European Patent Office in counterpart European Application No. 15755731.5.
(Continued)

*Primary Examiner* — Pierre Miche Bataille
(74) *Attorney, Agent, or Firm* — Sughrue Mion, PLLC

(57) ABSTRACT

A method of preventing a bank conflict in a memory includes determining processing timing of each of threads of function units to access a first memory bank in which occurrence of a bank conflict is expected, setting a variable latency of each of the threads for sequential access of the threads according to the determined processing timing, sequentially storing the threads in a data memory queue according to the determined processing timing, and performing an operation by allowing the threads stored in the data memory queue to sequentially access the first memory bank whenever the variable latency of each of the threads passes.

20 Claims, 13 Drawing Sheets

(51) Int. Cl.
  *G06F 13/372* (2006.01)
  *G06F 13/376* (2006.01)
  *G06F 13/16* (2006.01)
  *G06F 9/38* (2018.01)
  *G06F 9/52* (2006.01)
  *G06F 9/48* (2006.01)

(52) U.S. Cl.
  CPC .............. *G06F 9/4831* (2013.01); *G06F 9/52* (2013.01); *G06F 13/161* (2013.01); *G06F 13/1642* (2013.01); *G06F 13/372* (2013.01); *G06F 13/376* (2013.01); *G06F 2212/1008* (2013.01); *G06F 2212/1024* (2013.01); *G06F 2212/281* (2013.01); *G06F 2212/608* (2013.01)

(58) Field of Classification Search
  CPC .. G06F 9/3824; G06F 12/0844; G06F 9/4831; G06F 13/16; G06F 9/48
  USPC .......................................... 711/118, 169, 167
  See application file for complete search history.

(56) References Cited

U.S. PATENT DOCUMENTS

| | | | |
|---|---|---|---|
| 8,688,964 B2* | 4/2014 | Catherwood | G06F 13/24 710/260 |
| 2004/0031034 A1 | 2/2004 | Lewis | |
| 2008/0074433 A1 | 3/2008 | Jiao et al. | |
| 2008/0140980 A1 | 6/2008 | Mei et al. | |
| 2009/0138670 A1 | 5/2009 | Mutlu et al. | |
| 2009/0216962 A1* | 8/2009 | Mutlu | G06F 9/4881 711/151 |
| 2009/0260013 A1* | 10/2009 | Heil | G06F 15/7825 718/103 |
| 2011/0276974 A1 | 11/2011 | Chung et al. | |
| 2012/0079503 A1* | 3/2012 | Dally | G06F 9/3851 718/108 |
| 2015/0046684 A1* | 2/2015 | Mehrara | G06F 8/45 712/220 |
| 2017/0102948 A1* | 4/2017 | Branscome | G06F 9/3836 |

FOREIGN PATENT DOCUMENTS

| | | |
|---|---|---|
| EP | 1 579 335 B1 | 8/2008 |
| EP | 2523120 A1 | 11/2012 |
| WO | 2008036852 A1 | 3/2008 |

OTHER PUBLICATIONS

International Search Report for PCT/KR2015/001854 dated May 26, 2015 [PCT/ISA/210].

Communication dated Jul. 6, 2018, issued by the State Intellectual Property Office of P.R. China in counterpart Chinese Application No. 201580016865.X.

* cited by examiner

[Fig. 1]
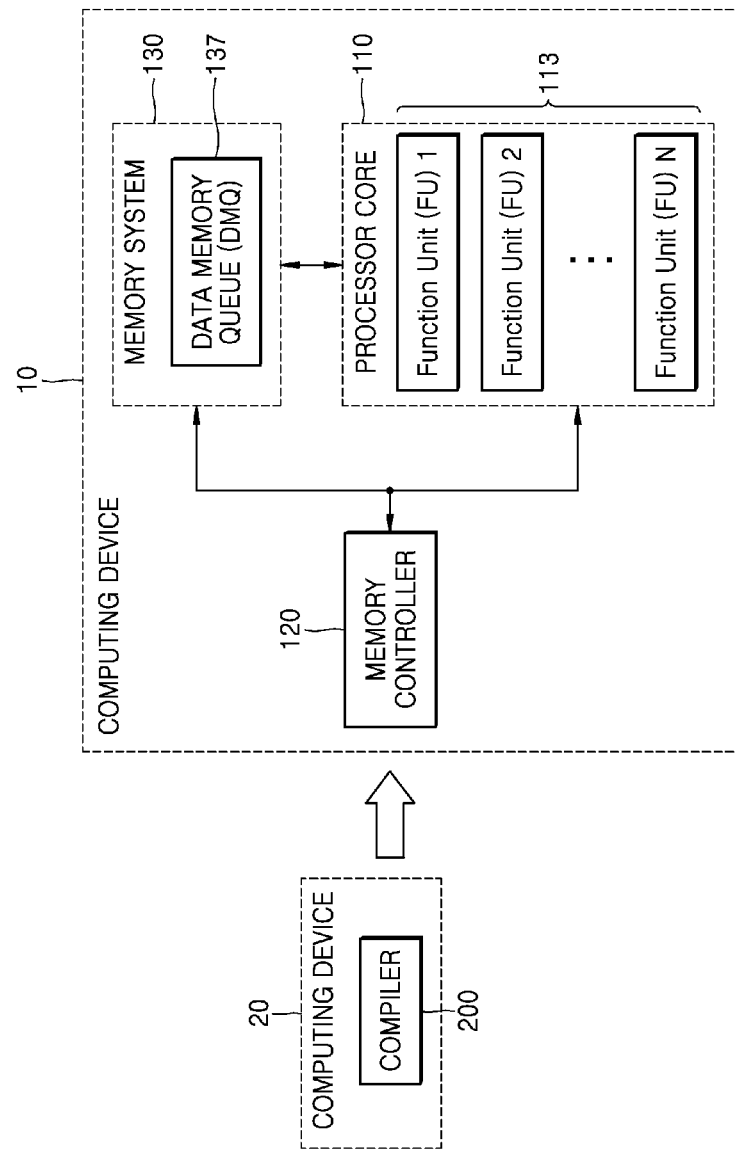

[Fig. 2]
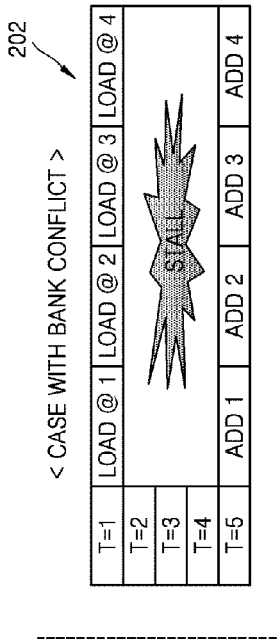
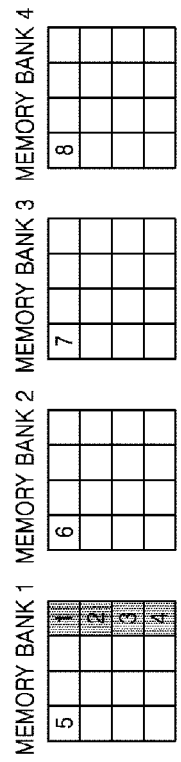
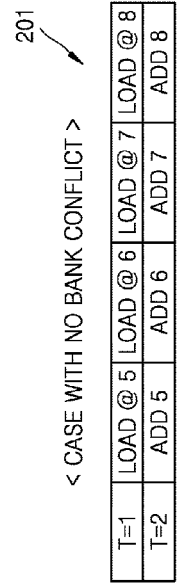

[Fig. 3]
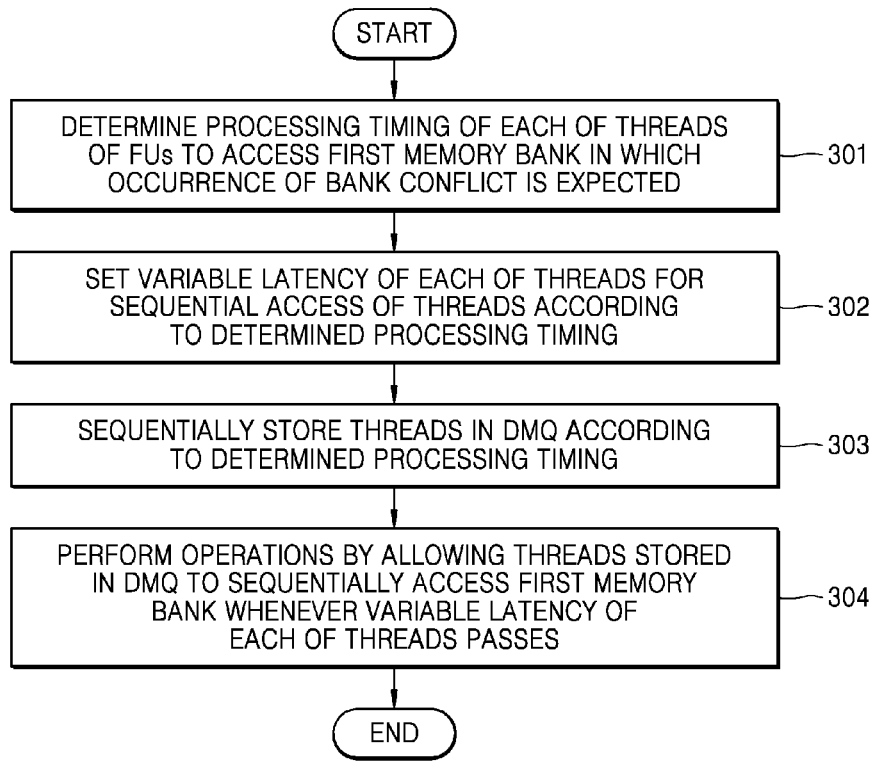
[Fig. 4]
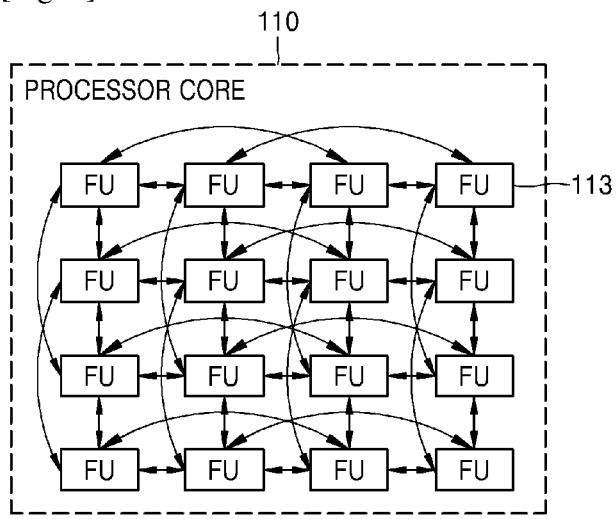

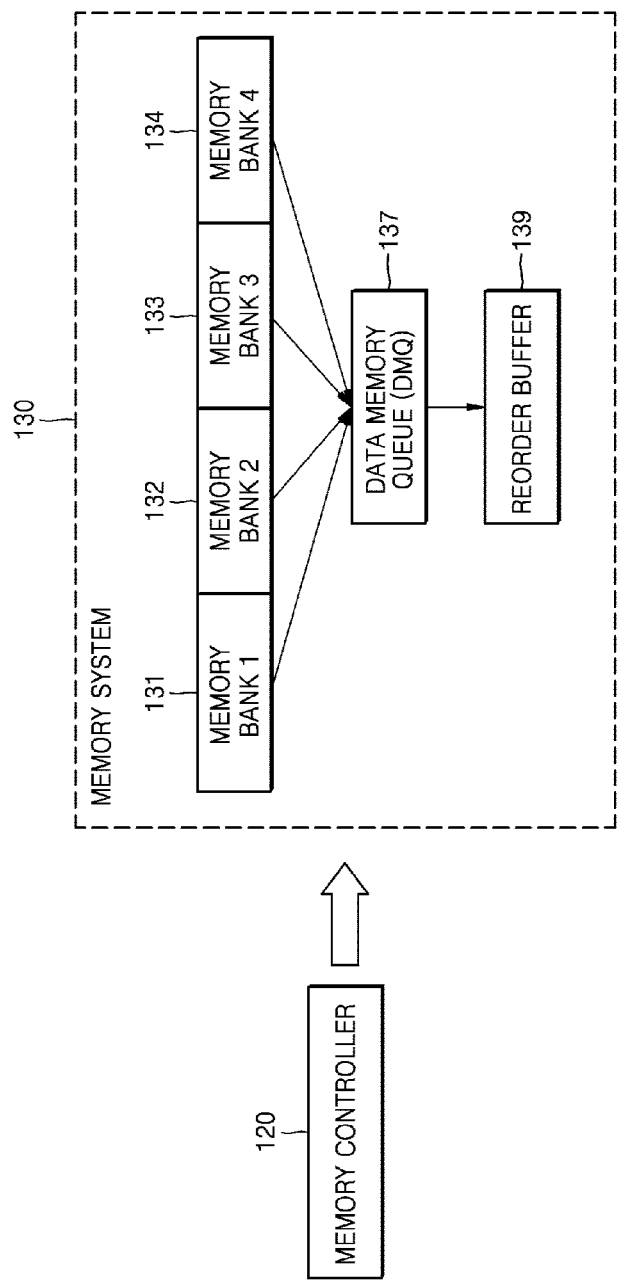

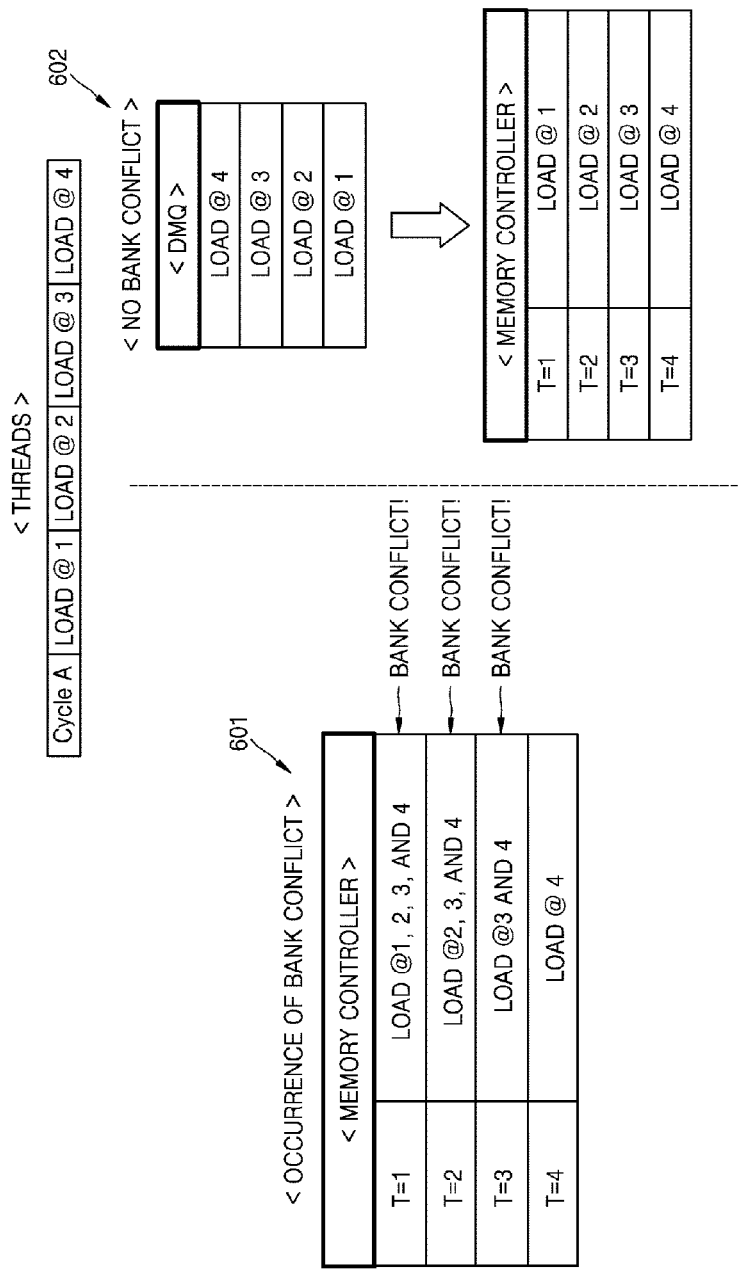
[Fig. 6]

[Fig. 7]
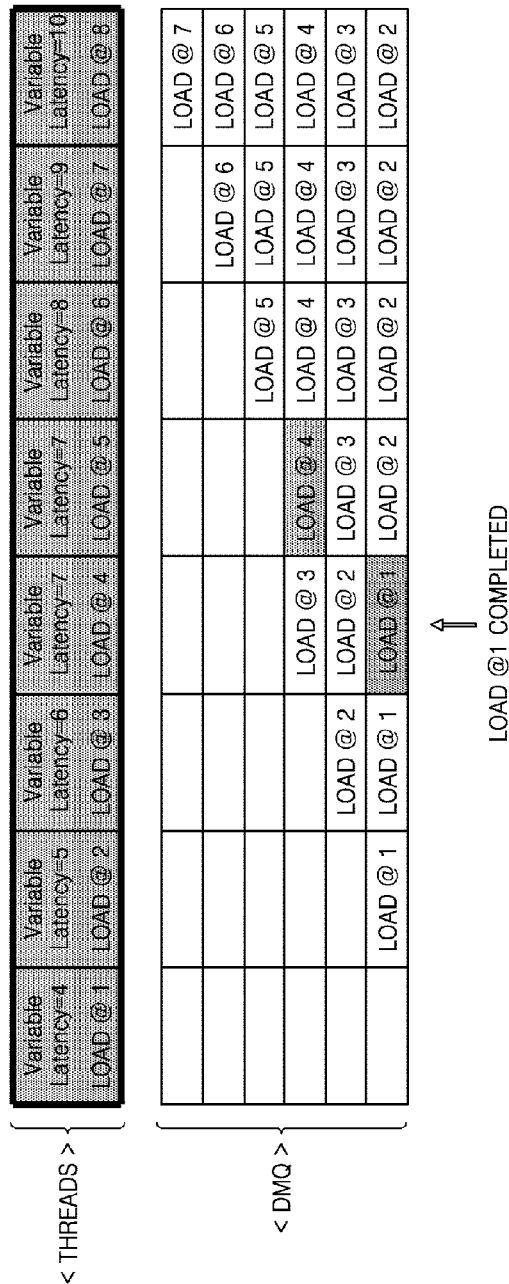

[Fig. 8a]
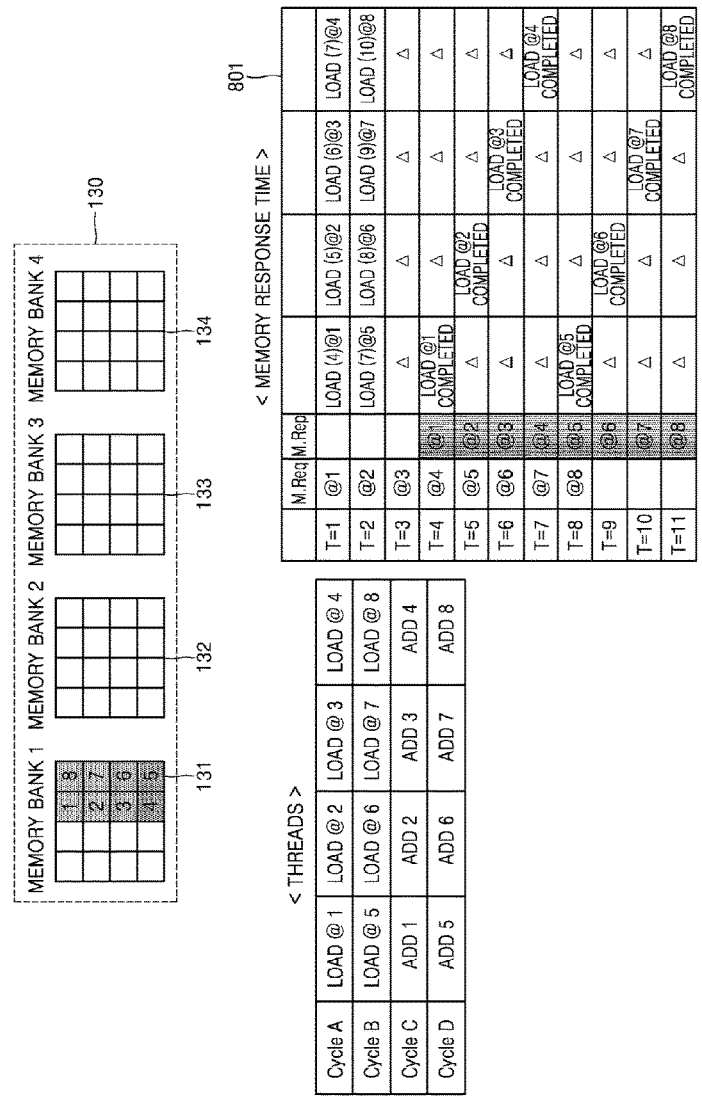
[Fig. 8b]
< PROCESSING SCHEDULE : VARIABLE LATENCY = 4~10 cycle >
| T=1 | LOAD (4)@1 | LOAD (5)@2 | LOAD (6)@3 | LOAD (7)@4 |
|---|---|---|---|---|
| T=2 | LOAD (7)@5 | LOAD (8)@6 | LOAD (9)@7 | LOAD (10)@8 |
| T=3 | △ | △ | △ | △ |
| T=4 | ADD 1 | △ | △ | △ |
| T=5 | △ | ADD 2 | △ | △ |
| T=6 | △ | △ | ADD 3 | △ |
| T=7 | △ | △ | △ | ADD 4 |
| T=8 | ADD 5 | △ | △ | △ |
| T=9 | △ | ADD 6 | △ | △ |
| T=10 | △ | △ | ADD 7 | △ |
| T=11 | △ | △ | △ | ADD 8 |
→ NO BANK CONFLICT!

[Fig. 9a]
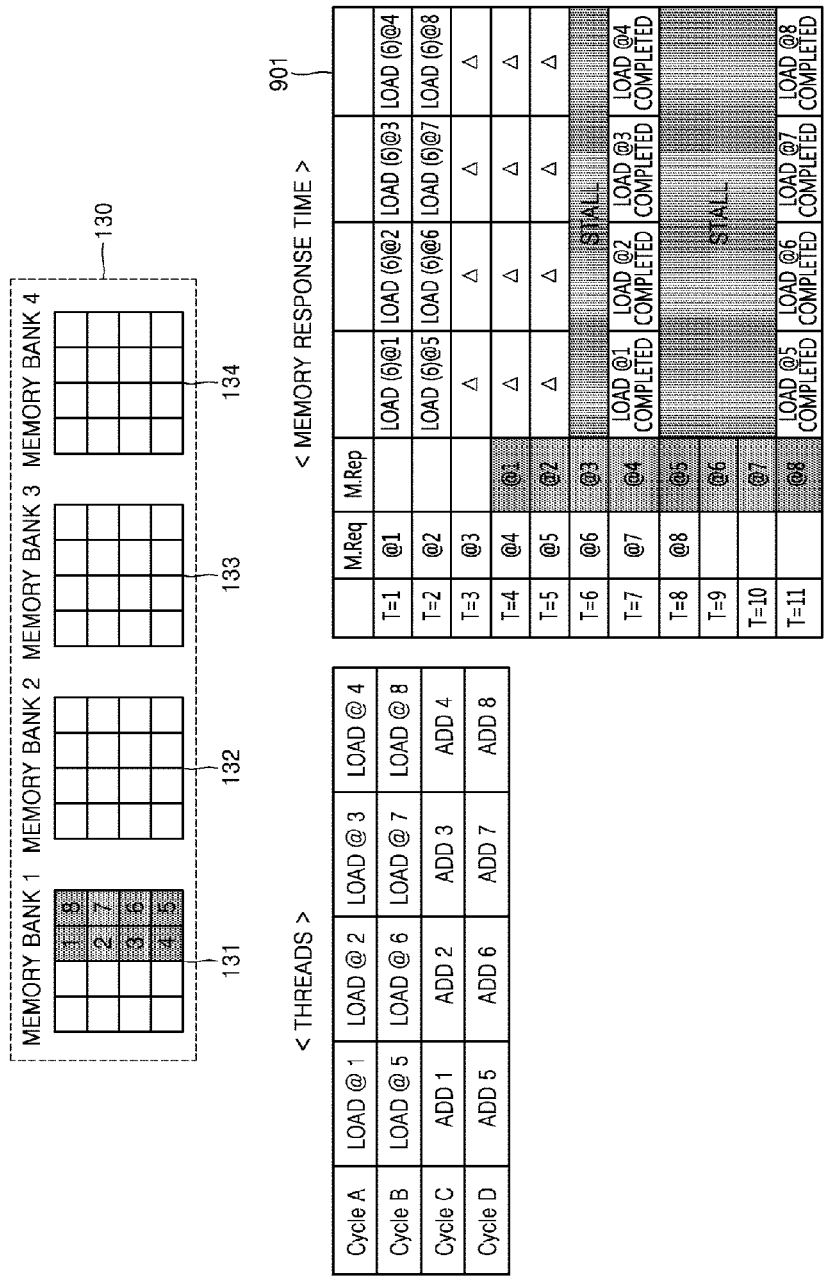

[Fig. 9b]
< PROCESSING SCHEDULE : LATENCY = fixed 6 cycle >

| T=1 | LOAD (6)@1 | LOAD (6)@2 | LOAD (6)@3 | LOAD (6)@4 |
|---|---|---|---|---|
| T=2 | LOAD (6)@5 | LOAD (6)@6 | LOAD (6)@7 | LOAD (6)@8 |
| T=3 | △ | △ | △ | △ |
| T=4 | △ | △ | △ | △ |
| T=5 | △ | △ | △ | △ |
| T=6 | STALL | | | |
| T=7 | ADD 1 | ADD 2 | ADD 3 | ADD 4 |
| T=8 | STALL | | | |
| T=9 | | | | |
| T=10 | | | | |
| T=11 | ADD 5 | ADD 6 | ADD 7 | ADD 8 |
| T=12 | △ | △ | △ | △ |
| T=13 | △ | △ | △ | △ |
| T=14 | △ | △ | △ | △ |

→ BANK CONFLICT!

[Fig. 10a]

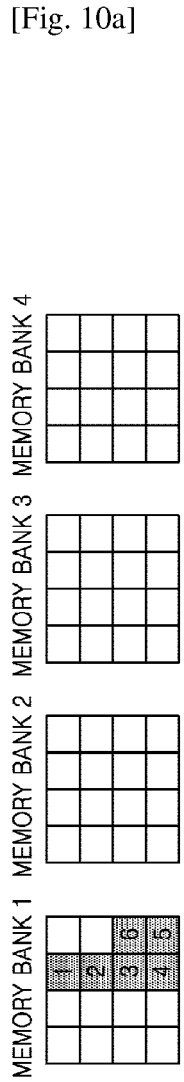

< MEMORY BANK 1   MEMORY BANK 2   MEMORY BANK 3   MEMORY BANK 4 >

< PROCESSING SCHEDULE : VARIABLE LATENCY = 4~8 CYCLE >

| | | | | |
|---|---|---|---|---|
| T=1 | LOAD (4)@1 | LOAD (5)@2 | LOAD (6)@3 | △ |
| T=2 | LOAD (6)@4 | LOAD (7)@5 | LOAD (8)@6 | △ |
| T=3 | △ | △ | △ | △ |
| T=4 | ADD 1 | △ | △ | △ |
| T=5 | △ | ADD 2 | △ | △ |
| T=6 | △ | △ | ADD 3 | △ |
| T=7 | ADD 4 | △ | △ | △ |
| T=8 | △ | ADD 5 | △ | △ |
| T=9 | △ | △ | ADD 6 | △ |
| T=10 | | | | |
| T=11 | | | | |

→ NO BANK CONFLICT!

- TOTAL NUMBER OF CYCLES : 9 CYCLE
- OCCURRED STALL : 0 CYCLE
- AVERAGE LATENCY : 6 CYCLE

< THREADS >

| | | | |
|---|---|---|---|
| Cycle A | LOAD @ 1 | LOAD @ 2 | LOAD @ 3 |
| Cycle B | LOAD @ 4 | LOAD @ 5 | LOAD @ 6 |
| Cycle C | ADD 1 | ADD 2 | ADD 3 |
| Cycle D | ADD 4 | ADD 5 | ADD 6 |

[Fig. 10b]

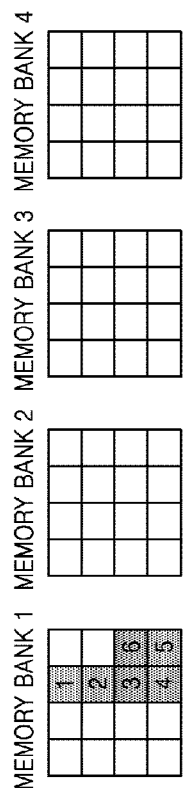

MEMORY BANK 1  MEMORY BANK 2  MEMORY BANK 3  MEMORY BANK 4

< THREADS >

|         | Cycle A  | Cycle B  | Cycle C | Cycle D |
|---------|----------|----------|---------|---------|
|         | LOAD @ 1 | LOAD @ 2 | LOAD @ 3 |        |
|         | LOAD @ 4 | LOAD @ 5 | LOAD @ 6 |        |
|         | ADD 1    | ADD 2    | ADD 3   |         |
|         | ADD 4    | ADD 5    | ADD 6   |         |

< PROCESSING SCHEDULE : LATENCY = FIXED 6 CYCLE >

|      |             |             |             |   |
|------|-------------|-------------|-------------|---|
| T=1  | LOAD (6)@1  | LOAD (6)@2  | LOAD (6)@3  | ◁ |
| T=2  | LOAD (6)@4  | LOAD (6)@5  | LOAD (6)@6  | ◁ |
| T=3  | ◁           | ◁           | ◁           | ◁ |
| T=4  | ◁           | ◁           | ◁           | ◁ |
| T=5  | ◁           | ◁           | ◁           | ◁ |
| T=6  | ADD 1       | ADD 2       | ADD 3       |   |
| T=7  |             | STALL       |             |   |
| T=8  |             |             |             |   |
| T=9  | ADD 4       | ADD 5       | ADD 6       |   |
| T=10 | ◁           | ◁           | ◁           | ◁ |
| T=11 | ◁           | ◁           | ◁           | ◁ |

→ NO BANK CONFLICT!

- TOTAL NUMBER OF CYCLES : 11 CYCLE
- OCCURRED STALL : 2 CYCLE
- OCCURRED STALL : 6 CYCLE

[Fig. 11a]
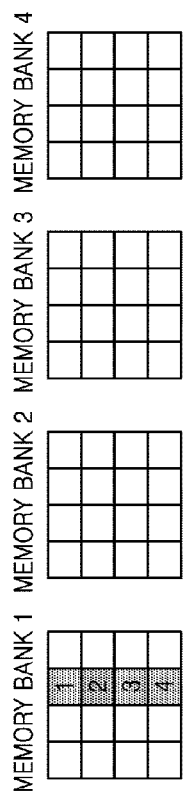

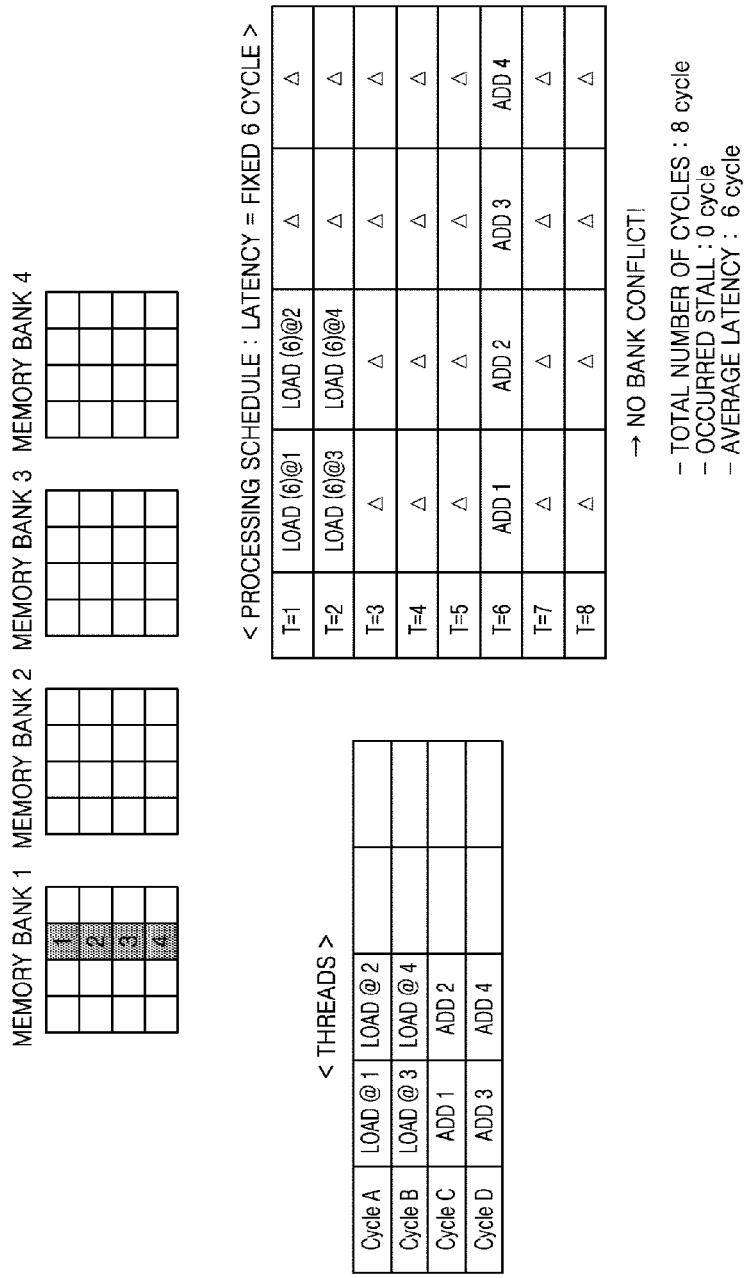
[Fig. 11b]

METHOD AND APPARATUS FOR PREVENTING BANK CONFLICT IN MEMORY

TECHNICAL FIELD

One or more embodiments of the present invention relate to a method and apparatus for preventing a bank conflict in a memory, and more particularly, to a method and apparatus for preventing a bank conflict in a memory system having multiple memory banks.

BACKGROUND ART

Multi-core processors or reconfigurable processors have high efficiency such as low power and improved operation ability and thus are widely used not only for computing apparatuses such as general personal computers (PCs) or notebook computers, but also for embedded apparatuses. There is a recent trend to further increase the number of processor cores or the number of function units (FUs) of a reconfigurable processor in order to increase an operation rate or an operation amount that is an index of processing performance of a processor. However, as the number of processor cores or the number of FUs increases, accesses to a memory bank in a memory system increase and thus a probability of occurrence of bank conflicts increases. Since frequent bank conflicts are a major reason for degraded performance of a processor, a solution to prevent the occurrence of bank conflicts is needed.

DISCLOSURE OF INVENTION

Technical Problem

One or more embodiments of the present invention include a method and apparatus for preventing a bank conflict in a memory.

One or more embodiments of the present invention include a computer-readable recording medium having recorded thereon a program for executing the above method in a computer.

Additional aspects will be set forth in part in the description which follows and, in part, will be apparent from the description, or may be learned by practice of the presented embodiments.

Solution to Problem

According to one or more embodiments of the present invention, a method of preventing a bank conflict in a memory includes determining processing timing of each of threads of function units to access a first memory bank in which occurrence of a bank conflict is expected, setting a variable latency of each of the threads for sequential access of the threads according to the determined processing timing, sequentially storing the threads in a data memory queue according to the determined processing timing, and performing an operation by allowing the threads stored in the data memory queue to sequentially access the first memory bank whenever the variable latency of each of the threads passes.

In the setting of the variable latency of each of the threads, the variable latency may be set to be a different value for each of the threads based on the processing timing.

In the setting of the variable latency of each of the threads, the variable latency may be set based on the number of stacks of the threads to be stored in the data memory queue at the determined processing timing and a fixed response time of the first memory bank.

In the setting of the variable latency of each of the threads, the variable latency may be set by adding a predetermined field for designating a value of the variable latency to instructions about the threads.

In the setting of the variable latency of each of the threads, the variable latency may be set such that the operation is performed at a point of time when a fixed response time of the first memory bank passes from a point of time when data about each of the threads is requested from the first memory bank.

The variable latency may be set in proportion to the number of bank conflicts to occur by the threads in the first memory bank.

The performing of the operation may include checking priorities of the threads that are stored in the data memory queue, allowing the threads to sequentially access the first memory bank in a priority order, storing processing results of the accessing threads in a reorder buffer, and performing the operation by reading out the stored processing results.

When storing of a thread of a second cycle is requested in a state in which storing of threads of a first cycle requested by the functions units is completed, the data memory queue may newly store the thread of the second cycle by erasing a thread with the highest priority from among the threads of the first cycle.

In the setting of the variable latency of each of the threads, the variable latency may be set such that a variable latency of a thread with the lowest priority from among threads of a first cycle that are requested by the function units and a thread with the highest priority from among threads of a second cycle that are requested by the functions units are identical to each other.

The threads of the function units may include threads that are generated in a coarse-grained array (CGA) mode.

The method may be performed in a scheduling process by a compiler.

According to one or more embodiments of the present invention, there is a computer readable recording medium having recorded thereon a program for executing the above method.

According to one or more embodiments of the present invention, an apparatus for preventing a bank conflict in a memory includes a plurality of function units generating threads to access a first memory bank in which occurrence of a bank conflict is expected, a memory controller determining processing timing of each of the threads and setting a variable latency of each of the threads for sequential access of the threads according to the determined processing timing, and a data memory queue sequentially storing the threads according to the determined processing timing, in which the memory controller controls performance of an operation by allowing the threads stored in the data memory queue to sequentially access the first memory bank whenever the variable latency of each of the threads passes.

The memory controller may set the variable latency to be a different value for each of the threads based on the processing timing.

The memory controller may set the variable latency based on the number of stacks of the threads to be stored in the data memory queue at the determined processing timing and a fixed response time of the first memory bank.

The memory controller may set the variable latency by adding a predetermined field for designating a value of the variable latency to instructions about the threads.

The memory controller may set the variable latency such that the operation is performed at a point of time when a fixed response time of the first memory bank passes from a point of time when data about each of the threads is requested from the first memory bank.

The variable latency may be set in proportion to the number of bank conflicts to occur by the threads in the first memory bank.

The memory controller may check priorities of the threads that are stored in the data memory queue and allows the threads to sequentially access the first memory bank in a priority order. The apparatus may further include a recorder buffer that stores processing results of the accessing threads. The function units may perform the operation by reading out the stored processing results.

The memory controller may set the variable latency such that a variable latency of a thread with the lowest priority from among threads of a first cycle that are requested by the function units and a thread with the highest priority from among threads of a second cycle that are requested by the functions units are identical to each other.

Advantageous Effects of Invention

As described above, according to the one or more of the above embodiments of the present invention, by individually setting the variable latencies having difference values to threads of a processor requested to a certain memory bank in which occurrence of a bank conflict is expected, processor stalling may not occur and also the bank conflict may be prevented.

BRIEF DESCRIPTION OF DRAWINGS

These and/or other aspects will become apparent and more readily appreciated from the following description of the embodiments, taken in conjunction with the accompanying drawings in which:

FIG. 1 is a block diagram of a configuration of computing devices according to an embodiment;

FIG. 2 illustrates a case of a bank conflict that may generally occur in a memory;

FIG. 3 is a flowchart for describing a method of preventing a bank conflict in a memory according to an embodiment;

FIG. 4 is a detailed diagram of a configuration of a processor core according to an embodiment;

FIG. 5 is a detailed diagram of a configuration of a memory system according to an embodiment;

FIG. 6 is a view for describing scheduling of a compiler to prevent a bank conflict according to an embodiment;

FIG. 7 is a view for describing a method of setting a variable latency using a relationship between the variable latency and stacks of threads of a data memory queue (DMQ) according to an embodiment;

FIG. 8a is a view for describing a method of preventing a bank conflict by using a variable latency according to an embodiment;

FIG. 8b is a view for describing a processing schedule of a processor core by using a variable latency in a table of FIG. 8a;

FIG. 9a is a view for describing a bank conflict that may occur when a fixed latency is used instead of using the variable latency of FIG. 7;

FIG. 9b is a view for describing a processing schedule of a processor core by using a fixed latency in a table of FIG. 9a;

FIG. 10a is a view for describing a method of preventing a bank conflict by using a variable latency according to another embodiment;

FIG. 10b is a view for describing a bank conflict that may occur when a fixed latency is used, unlike FIG. 10a;

FIG. 11a is a view for describing a method of preventing a bank conflict by using a variable latency according to another embodiment; and FIG. 11b is a view for describing a bank conflict that may occur when a fixed latency is used, unlike FIG. 11a.

BEST MODE FOR CARRYING OUT THE INVENTION

According to one or more embodiments of the present invention, a method of preventing a bank conflict in a memory includes determining processing timing of each of threads of function units to access a first memory bank in which occurrence of a bank conflict is expected, setting a variable latency of each of the threads for sequential access of the threads according to the determined processing timing, sequentially storing the threads in a data memory queue according to the determined processing timing, and performing an operation by allowing the threads stored in the data memory queue to sequentially access the first memory bank whenever the variable latency of each of the threads passes.

According to one or more embodiments of the present invention, there is a computer readable recording medium having recorded thereon a program for executing the above method.

According to one or more embodiments of the present invention, an apparatus for preventing a bank conflict in a memory includes a plurality of function units generating threads to access a first memory bank in which occurrence of a bank conflict is expected, a memory controller determining processing timing of each of the threads and setting a variable latency of each of the threads for sequential access of the threads according to the determined processing timing, and a data memory queue sequentially storing the threads according to the determined processing timing, in which the memory controller controls performance of an operation by allowing the threads stored in the data memory queue to sequentially access the first memory bank whenever the variable latency of each of the threads passes.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In the following description, embodiments are described in detail with reference to the accompanying drawings.

FIG. 1 is a block diagram of a configuration of computing devices according to an embodiment. Referring to FIG. 1, a computing device 10 may include a processor core 110 having a plurality of function units (FUs) 113, a memory controller 120, and a memory system 130. However, although it is not illustrated in FIG. 1, the computing device 10 may include a plurality of processor cores. A computing device 20 may include a compiler 200. The computing devices 10 and 20 may correspond to separate independent devices or may be embodied by separate modules in one device. For example, the computing device 20 may be a personal computer (PC) that compiles a program code including a loop and actually compiled instructions may be executed by the other computing device 10 such as smartphones or tablet devices. The computing devices 10 and 20 may be embodied by PCs, server computers, smart phones, personal digital assistants (PDAs), portable media players (PMPs), navigation devices, TVs, contents reproduction apparatuses, communication systems, image processing systems, graphics processing systems, laptop computers, or tablet PCs, or may be included therein.

The compiler 200 converts a given program code to a low-level language. For example, the compiler 200 converts a program code written in a high-level language to an assembly language or a machine language. The compiler 200 may schedule operations of the FUs 113 by using instructions of the converted assembly language or machine language. The compiler 200 may provide scheduling of a coarse-grained array (CGA) mode when, for example, the processor core 110 is a reconfigurable processor. The compiler 200 may use information stored in a memory (not shown) of the computing device 20 to compile the written program code.

The computing device 20 may previously store information about a given program code, an architecture of a reconfigurable processor, for example, the processor core 110, to execute a program code, details of the FUs 113, interconnection between the FUs 113, details of a configuration memory, the number of register files, interconnection between the FUs 113 and the register files.

Meanwhile, for convenience of explanation of an embodiment, only relevant constituent elements are illustrated in FIG. 1 in respect to the computing devices 10 and 20. Accordingly, it would be understood by one of ordinary skill in the art that other common constituent elements may be further provided in addition to the constituent elements illustrated in FIG. 1.

FIG. 2 illustrates a case of a bank conflict that may generally occur in a memory.

General memory devices such as dynamic random access memory (DRAM) or static random access memory (SRAM) may include a plurality of memory banks that are divided from a memory area into a predetermined number to be independently accessible. Different processor cores or different FUs may request, from the memory device, data about different threads to be processed by the respective processor cores or FUs. An example of a case in which the memory device is divided into four (4) memory banks of a memory bank 1, a memory bank 2, a memory bank 3, and a memory bank 4 is described below with reference to FIG. 2. On the other hand, in FIG. 2 and the subsequent drawings, a term "T=n", where n is a natural number, denotes one (1) clock unit as a processing time of a cycle according to the number of clocks set in the processor core s performance.

First, in a case 201 in which bank conflicts do not occur, threads at T=1 may include a thread of LOAD @5 for loading data at an address 5 of the memory bank 1, a thread of LOAD @6 for loading data at an address 6 of the memory bank 2, a thread of LOAD @7 for loading data at an address 7 of the memory bank 3, and a thread of LOAD @8 for loading data at an address 8 of the memory bank 4. Threads at T=2 include threads of ADD 5 to ADD 8 that are addition operations using the data read out by the threads of LOAD @5 to LOAD @8. Since the processor cores or FUs respectively access different memory banks during the same cycle, for example, T=1, parallel data loading and operation may be performed without any bank conflict.

A point of time when an addition operation of an ADD m, where m is a natural number, is performed may correspond to a point of time or a cycle when reading out a thread of LOAD @m is completed. For example, LOAD @5 may denote a point of time when data about a thread of LOAD @5 is read from the address 5 of the memory bank 1. ADD 5 may denote a point of time when an addition operation using a thread of LOAD @5 is available. The LOAD and ADD are processed by separate FUs or separate processor cores, in which no bank conflict occurs.

In a case 202 in which a bank conflict occurs, a plurality of processor cores or a plurality of FUs simultaneously request data about a plurality of threads from one memory bank, for example, the memory bank 1, within one (1) cycle. Threads at T=1 may include a thread of LOAD @1 for loading data at an address 1 of the memory bank 1, a thread of LOAD @1 for loading data at an address 1 of the memory bank 1, a thread of LOAD @3 for loading data at an address 3 of the memory bank 1, and a thread of LOAD @4 for loading data at an address 4 of the memory bank 1. Since data of address 1 to address 4 may not be simultaneously loaded from the memory bank 1, as illustrated in FIG. 2, a processor stalling occurs at T=2 to T=4. As a result, the reading out of the data of LOAD @1 to LOAD @4 is completed at T=5 and accordingly operations of ADD 1 to ADD 4 are performed at T=5. Also, during T=2 to T=4 in which the process stalling occurs, other operations may not be performed so that a processing resource may be inefficiently used, for example, a decrease in an operation speed. Since a processor processes lots of operations by loading/storing a large amount of data from a memory, the bank conflict of simultaneously requesting data about different threads from one memory bank may frequently occur.

On the other hand, according to the present embodiment, even when data about many threads are simultaneously requested from one memory bank, for example, the memory bank 1, a bank conflict, that is, a phenomenon that a processor stalling occurs, may be prevented. In the following description, a method of preventing a bank conflict in a memory and the operations of the computing devices 10 and 20 are described in detail according to the present embodiment.

FIG. 3 is a flowchart for describing a method of preventing a bank conflict in a memory according to an embodiment.

Referring to FIG. 3, a method of preventing a bank conflict in a memory may be about a compilation schedule of the compiler 200 of the computing device 10 of FIG. 1. In operation 301, the compiler 200 determines processing timing of each of threads of FUs 113 to access a memory bank in which occurrence of a bank conflict is expected.

In operation 302, the compiler 200 sets a variable latency of each of the threads for sequential access of the threads according to the determined processing timing. In doing so, since the compiler 200 may variably set latency for each thread based on the processing timing to the threads, the latency of each of the threads may have a different value. In particular, the compiler 200 may set a variable latency by adding a predetermined field for defining a latency value to instructions included in the threads. For example, the compiler 200 may generate instructions of LOAD $R_{dest}$, Address $[R_x, R_y]$, and $R_{latency}$ as a LOAD instruction. The LOAD $R_{dest}$ is a field for instructing to load data from a memory bank $R_{dest}$. The Address$[R_x, R_y]$ is a field for indicating an address of the memory bank $R_{dest}$ from which data is to be loaded. The compiler 200 may set a variable latency by adding the $R_{latency}$ field to the LOAD instruction. The variable latency may be set to prevent stalling of the FUs 113 until all operations are completely performed and may be set in proportion to the number of bank conflicts occurring by threads in a memory bank.

In operation 303, the compiler 200 may schedule such that data about threads may be sequentially stored in a data memory queue (DMQ) according to the determined processing timing.

In operation 304, the compiler 200 performs operations by sequentially allowing the threads stored in the DMQ to access the memory bank whenever a variable latency of each of the threads passes. In detail, the compiler 200 checks priority of each of the threads stored in the DMQ and allows the threads to access the memory bank in a priority order. Then, the compiler 200 schedules such that results of processing of the accessing threads are stored in a reorder buffer (for example, a reorder buffer 139 of FIG. 5). Finally, the compiler 200 schedules such that the processor core 110 may read out the processing results stored in the reorder buffer and perform operations.

In summary, the compiler 200 performs scheduling such that each hardware included in the computing device 10 may operate as in operations 301 to 304, thereby preventing a bank conflict.

On the other hand, the method of preventing a bank conflict in a memory of FIG. 3 may be an operation sequence of the computing device 10 in which a compilation schedule of the compiler 200 is embedded. FIG. 3 is described below in view of the computing device 10.

In operation 301, the FUs 113 generate threads to access a memory bank in which occurrence of a bank conflict is expected.

In operation 302, the memory controller 120 determines processing timing of each of the threads and sets a variable latency of each of the threads for sequential access of the threads according to the determined processing timing. Since the memory controller 120 may variably set latency for each of the threads based on the processing timing of the threads, the latencies of the threads may have different values. In particular, the memory controller 120 may set the variable latency by adding a predetermined field for designating a latency value to instructions about the threads. For example, the memory controller 120 may set the variable latency by adding a $R_{latency}$ field such as LOAD $R_{dest}$, Address[$R_x$, $R_y$], and $R_{latency}$ regarding a LOAD instruction. The variable latency may be set to prevent stalling of the FUs 113 until all operations are completely performed and may be set in proportion to the number of bank conflicts that occur in the memory bank by the threads.

In operation 303, the DMQ sequentially stores the threads according to the determined processing timing.

In operation 304, the memory controller 120 controls the performance of an operation by allowing the threads stored in the DMQ to sequentially access the memory bank whenever the variable latency of each of the threads passes. In detail, the memory controller 120 checks priority of each of the threads stored in the DMQ and allows the threads to access the memory bank in a priority order. Then, the memory controller 120 stores results of processing of the accessing threads in the reorder buffer. Finally, the processor core 110 reads out the processing results stored in the reorder buffer and performs operations.

FIG. 4 is a detailed diagram of a configuration of the processor core 110 according to an embodiment.

Referring to FIG. 4, the processor core 110 is hardware for performing a particular task, instruction, or operation and includes the FUs 113. The FUs 113 may correspond to arithmetic logic units (ALUs), multipliers, or load/store units. A plurality of input/output paths may be provided between the FUs 113. Also, the processor core 110 may include a variety of types of register files such as local register files.

The processor core 110 may process a loop operation in parallel by using the FUs 113 included in the processor core 110 according to the CGA mode. In other words, when the processor core 110 operates according to the CGA mode, the processor core 110 may perform a loop level parallelism (LLP).

FIG. 5 is a detailed diagram of a configuration of a memory system according to an embodiment. Referring to FIG. 5, the load/store operations of the memory system 130 may be controlled by the memory controller 120.

The memory system 130 may include N-number of memory banks 131, 132, 133, and 134, where N is a natural number, a data memory queue (DMQ) 137, and the reorder buffer 139. For convenience of explanation, although FIG. 5 illustrates that the memory system 130 includes a memory bank 1 131, a memory bank 2 132, a memory bank 3 133, and a memory bank 4 134, the present embodiment is not limited thereto and the memory system 130 may include various numbers of the memory banks.

In the following description, how the above-described method of preventing a bank conflict of FIG. 3 is embodied by using hardware structures of the computing device 10 and the computing device 20 is described in detail.

FIG. 6 is a view for describing scheduling of a compiler to prevent a bank conflict according to an embodiment.

Referring to FIG. 6, the threads requested by the processor core 110 include LOAD @1, LOAD @2, LOAD @3, and LOAD @4 that are to be performed during Cycle A. It is assumed that LOAD @1 to LOAD @4 are threads to access one memory bank, for example, the memory bank 1 of FIG. 2. As described above, LOAD @1 is a thread for loading the data of address 1 of a memory bank, for example, the memory bank 1 of FIG. 2, LOAD @2 is a thread for loading the data of address 2 of the same memory bank, that is, the memory bank 1, LOAD @3 is a thread for loading the data of address 3 of the same memory bank, that is, the memory bank 1, and LOAD @4 is a thread for loading the data of address 4 of the same memory bank, that is, the memory bank 1, First, when the memory controller 120 requests data about the threads of LOAD @1 to LOAD @4 of Cycle A simultaneously from the memory bank 1 131 of the memory system 130, a bank conflict occurs (601).

In detail, at T=1, even when the memory controller 120 requests all data about the threads of LOAD @1 to LOAD @4 from the memory bank 1 131, only the thread of LOAD @1 may access the memory bank 1 131. Accordingly, at T=1, a bank conflict occurs in the threads of LOAD @2 to LOAD @4. Likewise, at T=2, even when the memory controller 120 requests all data about the threads of LOAD @2 to LOAD @4 from the memory bank 1 131, only the thread of LOAD @2 may access the memory bank 1 131. Accordingly, at T=2, a bank conflict occurs in the threads of LOAD @3 and LOAD @4. Consequently, at T=1 to T=3, all bank conflicts may occur.

Unlike the above, each of the threads may be processed without any bank conflict by using the DMQ 137 according to the present embodiment.

In detail, in a case in which no bank conflict occurs (602), the memory controller 120 may control such that the threads of LOAD @1, LOAD @2, LOAD @3, and LOAD @4 of Cycle A are sequentially stored in the DMQ 137. In other words, the threads are primarily stored in the DMQ 137 before accessing the memory bank 1 131.

Then, at T=1, LOAD @1 that is a thread having the highest priority in the DMQ 137 accesses the memory bank 1 131. Next, LOAD @2 at T=2, LOAD @3 at T=3, and LOAD @4 at T=4 access the memory bank 1 131. Accordingly, since only one thread accesses the memory bank 1 131 at each point of time, a bank conflict does not occur.

As a result, the compiler 200 performs scheduling such that the processor core 110, the memory controller 120, and the DMQ 137 may operate in the above sequence.

FIG. 7 is a view for describing a method of setting a variable latency using a relationship between the variable latency and stacks of threads of the DMQ 137 according to an embodiment. In the following description, the relationship between the variable latency and stacks of threads of the DMQ 137 is described below with reference to FIG. 7.

Referring to FIG. 7, it is assumed that the threads include LOAD @1, LOAD @2, LOAD @3, and LOAD @4 to be performed at T=1 and LOAD @5, LOAD @6, LOAD @7, and LOAD @8 to be performed at T=2.

The variable latency may be set by using Math FIG. 1.

MathFigure 1

Variable Latency=(Fixed Memory Response Time)+ (the number of DMQ Stacks)   [Math.1]

Referring to Math FIG. 1, the "Variable Latency" may be calculated by a sum of the fixed memory response time of the memory system 130 and the number of threads stacked in the DMQ 137. In FIG. 7 and the subsequent drawings, it is assumed that the fixed memory response time of the memory system 130 is fixed to four (4) cycles. However, this is merely for convenience of explanation and the response time of the memory system 130 may vary according to hardware specifications of the memory system 130.

Since in FIG. 7 LOAD @1 is assumed to be a thread with the highest priority, no thread is stored in the DMQ 137. Accordingly, since Fixed Memory Response Time=4 and the number of DMQ Stacks=0, the variable latency of LOAD @1 is set to be a value of 4.

The thread of LOAD @2 may be accessed next to the thread of LOAD @1 in the memory bank 1 131. Accordingly, the thread of LOAD @1 is already stored in the DMQ 137 at the point of time when data about the thread of LOAD @2 is requested. Accordingly, since Fixed Memory Response Time=4 and the number of DMQ Stacks=1, the variable latency of LOAD @2 is set to be a value of 5.

In the same manner, since Fixed Memory Response Time=4 and the number of DMQ Stacks=2, the variable latency of LOAD @3 is set to be a value of 6. Also, since Fixed Memory Response Time=4 and the number of DMQ Stacks=3, the variable latency of LOAD @4 is set to be a value of 7.

Due to a bank conflict, only the thread of LOAD @1 may be accessed in the memory bank 1 131 at T=1. Accordingly, at T=2 when data about the thread of LOAD @5 is requested, the thread of LOAD @1 stored in the DMQ 137 is erased. Accordingly, since Fixed Memory Response Time=4 and the number of DMQ Stacks=3, the variable latency of LOAD @5 is set to be a value of 7 that is the same as the variable latency of LOAD @4.

The thread of LOAD @6 may be accessed next to the thread of LOAD @5 in the memory bank 1 131. Accordingly, the threads of LOAD @2 to LOAD @5 are stored in the DMQ 137 at the point of time when data about the thread of LOAD @6 is requested. Accordingly, since Fixed Memory Response Time=4 and the number of DMQ Stacks=4, the variable latency of LOAD @6 is set to be a value of 8.

In the same manner, since Fixed Memory Response Time=4 and the number of DMQ Stacks=5, the variable latency of LOAD @7 is set to be a value of 9. Also, since Fixed Memory Response Time=4 and the number of DMQ Stacks=6, the variable latency of LOAD @8 is set to be a value of 10.

In summary, in the scheduling method according to the present embodiment, a bank conflict may be prevented because a variable latency is set considering the stacks of threads stored in the DMQ 137. In other words, the compiler 200 may schedule setting of a variable latency depending on a queue depth of the DMQ 137.

FIG. 8a is a view for describing a method of preventing a bank conflict by using a variable latency according to an embodiment. Referring to FIG. 8a, the memory system 130 includes four (4) memory banks that are the memory bank 1 131, the memory bank 2 132, the memory bank 3 133, and the memory bank 4 134.

The threads of the processor core 110 include LOAD @1, LOAD @2, LOAD @3, and LOAD @4 to be performed during Cycle A and LOAD @5, LOAD @6, LOAD @7, and LOAD @8 to be performed during Cycle B. LOAD @1 to LOAD @8 are threads to access the memory bank 1 131. As described above, LOAD @1 is a thread to load data of address 1 of the memory bank 1 131 and LOAD @2 to LOAD @8 are threads to load data of addresses 2 to 8 of the memory bank 1 131. On the other hand, during Cycle C, ADD 1 that is an addition operation using the data read out by LOAD @1, ADD 2 that is an addition operation using the data read out by LOAD @2, ADD 3 that is an addition operation using the data read out by LOAD @3, and ADD 4 that is an addition operation using the data read out by LOAD @4 are performed. Also, likewise, ADD 5 to ADD 8 that are addition operations are performed during Cycle D. Cycle A to Cycle D may correspond to cycles of time that are not sequential, for example, T=1, T=2, T=7, and T=11, or cycles of time that are sequential, for example T=1 to T=4.

Referring to FIG. 8a, data about four threads of LOAD @1 to LOAD @4 of Cycle A may not be simultaneously requested from the memory bank 1 131. Also, data about four threads of LOAD @5 to LOAD @8 of Cycle B may not be simultaneously requested from the memory bank 1 131.

A table 801 of FIG. 8a showing request timing of the memory bank 1 131 and response timing of the memory bank 1 131 when the threads of LOAD @1 to LOAD @8 are respectively set to have the variable latencies as described above in FIG. 7 is described below.

During each cycle of T=1 to T=8, due to a bank conflict, threads may sequentially access the memory bank 1 131 one by one. In the table 801, "M.Req" denotes a memory request upon the memory bank 1 131.

As it is assumed above with respect to FIG. 7 that the fixed memory response time of the memory bank 1 131 is four (4) cycles, the memory bank 1 131 may response to each of cycles at T=4 to T=1. In the table 801, "M.Rep" denotes a memory response in the memory bank 1 131.

Consequently, since the responses of the memory bank 1 131 to the requests of LOAD @1 to LOAD @8 occur the same as the points of time when the variable latencies pass, the processor core 110 may read out data about the threads of LOAD @1 to LOAD @8 during the scheduled cycles and perform the addition operations of ADD 1 to ADD 8. Accordingly, the processor core 110 may process the addition operations of ADD 1 to ADD 8 without the occurrence of processor stalling.

In FIG. 8*a*, a term "LOAD (n)@m" denotes a thread of loading data of address m of a certain memory bank, meaning that the value of a variable latency is n cycles.

FIG. 8*b* is a view for describing a processing schedule of the processor core 110 by using the variable latencies in the table 801 of FIG. 8*a*. Referring to FIG. 8*b*, as it is described in the table 801 of FIG. 8*a*, the addition operations of ADD 1 to ADD 8 may be respectively performed at the points of time when the variable latencies set to the threads of LOAD @1 to LOAD @8 pass. In other words, when different variable latencies are set to the threads of LOAD @1 to LOAD @8, each of the responses of the memory bank 1 131 to the requests of LOAD @1 to LOAD @8 is completed at the points of time when a corresponding variable latency passes. Accordingly, the operations of ADD 1 to ADD 8 may be performed without the occurrence of processor stalling.

FIG. 9*a* is a view for describing a bank conflict that may occur when a fixed latency is used instead of using the variable latency of FIG. 7. Referring to FIG. 9*a*, unlike the variable latencies of four (4) cycles to ten (10) cycles of FIG. 8*a*, a table 901 shows a fixed latency of six (6) cycles that are identical to each other.

Since four (4) threads of LOAD @1 to LOAD @4 of Cycle A are all set to have a fixed latency of six (6) cycles, the processor core 110 expects that the responses of the memory bank 1 131 to the threads of LOAD @1 to LOAD @4 are completed at T=6. However, as it is assumed above in FIG. 7, since the fixed memory response time of the memory bank 1 131 is four (4) cycles, a response to the request of a thread of LOAD @1 starts to be completed from T=4 and thus a response to the request of threads of LOAD @1 to LOAD @4 is completed at T=7. Accordingly, since the processor core 110 has not yet read out data about the thread of LOAD @4 at T=6 that is expected by the scheduling of the processor core 110, processor stalling occurs in the processor core 110.

Likewise, although the processor core 110 expected that the memory responses are completed at T=7 with respect to the threads of LOAD @5 to LOAD @8 of Cycle B that are set to a fixed latency of six (6) cycles, there is no memory response to any of the threads of LOAD @5 to LOAD @8 at T=7. Consequently, since the memory response to the threads of LOAD @5 to LOAD @8 is not completed until T=11, processor stalling occurs in the processor core 110 at T=8 to T=10. Accordingly, compared with the cases in which the variable latencies of FIGS. 8*a* and 8*b* are set, when the identical fixed latency is set with respect to all threads as in FIG. 9*a*, a bank conflict may occur similarly to a case in which no latency is set.

FIG. 9*b* is a view for describing a processing schedule of the processor core 110 by using the fixed latency in the table 910 of FIG. 9*a*. Referring to FIG. 9*b*, as in the description about the table 901 of FIG. 9*a*, the addition operations of ADD 1 to ADD 8 may not be performed at a point of time when the fixed latency set to each of the threads of LOAD @1 to LOAD @8 passes. In other words, since the memory responses to the threads of LOAD @1 to LOAD @4 are not completed at T=6 when the fixed latency of six (6) cycles set to the threads of LOAD @1 to LOAD @4 passes, processor stalling occurs. Also, since the memory responses to the threads of LOAD @5 to LOAD @8 are not completed at T=7 when the fixed latency of six (6) cycles set to the threads of LOAD @5 to LOAD @8 passes, processor stalling occurs at T=8 to T=10 that are before the memory responses to the threads of LOAD @5 to LOAD @8 are completed.

Consequently, in view of FIGS. 8*a* to 9*b*, when occurrence of a bank conflict is expected, processor stalling may be sufficiently reduced by setting the variable latencies to the respective threads as illustrated in FIGS. 8*a* and 8*b*. Also, a bank conflict may be prevented.

Furthermore, since the processor stalling is sufficiently reduced, the processor core 110 may have high performance of parallelly performing processes at timings indicated by "Δ".

FIG. 10*a* is a view for describing a method of preventing a bank conflict by using a variable latency according to another embodiment. Referring to FIG. 10*a*, unlike FIGS. 8*a* and 8*b*, only the six (6) threads of LOAD @1 to LOAD @6 and the six (6) addition operations of ADD 1 to ADD 6 are processed. The variable latencies according to the method of FIG. 7 are set to the threads of LOAD @1 to LOAD @6.

FIG. 10*b* is a view for describing a bank conflict that may occur when a fixed latency is used, unlike FIG. 10*a*. Referring to FIG. 10*b*, a fixed latency of six (6) cycles is set as illustrated in FIGS. 9*a* and 9*b*, but only the six (6) threads of LOAD @1 to LOAD @6 and the six (6) addition operations of ADD 1 to ADD 6 are processed, unlike FIGS. 9*a* and 9*b*.

Comparing FIG. 10*a* and FIG. 10*b*, as it is described above in FIGS. 8*a* to 9*b*, the processing schedule of FIG. 10*a* may be performed without the occurrence of processor stalling due to the setting of the variable latency, whereas processor stalling may occur at T=7 and T=8 due to the fixed latency in the processing schedule of FIG. 10*b*.

Furthermore, when FIG. 10*a* and FIG. 10*b* are compared with each other, even when an average latency is identically six (6) cycles, all processing may be completed within a total of nine (9) cycles in FIG. 10*a* or a total of eleven (11) cycles in FIG. 10*b*. Accordingly, by setting the variable latency, not only processor stalling may be prevented, but also an operation rate may be improved.

FIG. 11*a* is a view for describing a method of preventing a bank conflict by using a variable latency according to another embodiment. Referring to FIG. 11*a*, unlike FIGS. 8*a* and 8*b*, only four (4) threads of LOAD @1 to LOAD @4 and four (4) additional operations of ADD 1 to ADD 4 are processed. The variable latencies according to the method described with reference to FIG. 7 are set to the threads of LOAD @1 to LOAD @4.

FIG. 11*b* is a view for describing a bank conflict that may occur when a fixed latency is used, unlike FIG. 11*a*. Referring to FIG. 11*b*, a fixed latency of six (6) cycles is set as in FIGS. 9*a* and 9*b*. However, unlike FIGS. 9*a* and 9*b*, only four (4) threads of LOAD @1 to LOAD @4 and four (4) addition operations of ADD 1 to ADD 4 are processed.

Comparing FIG. 11*a* and FIG. 11*b*, the processing schedules illustrated in FIGS. 11*a* and 11*b* may be performed without processor stalling regardless of the setting of a variable latency or a fixed latency.

However, when FIG. 11*a* and FIG. 11*b* are compared with each other, an average latency in FIG. 11*a* is five (5) cycles which is less than an average latency in FIG. 11*b* that is six (6) cycles. Accordingly, when the variable latency is set, an operation rate may be improved compared to a case in which a fixed latency is set.

As described above, according to the one or more of the above embodiments of the present invention, by individually setting the variable latencies having difference values to threads of a processor requested to a certain memory bank in which occurrence of a bank conflict is expected, processor stalling may not occur and also the bank conflict may be prevented.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A method of preventing a bank conflict in a memory, the method comprising:
   determining processing timing of each of a plurality of threads generated by a plurality of function units, wherein the processing timing is time required to access a first memory bank and in said access an occurrence of a bank conflict between at least two of the plurality of function units is expected;
   setting a variable latency of each of the plurality of threads for sequential access of the threads to the memory bank according to the determined processing timing;
   sequentially storing the plurality of threads in a data memory queue according to the determined processing timing; and
   performing an operation by allowing the plurality of threads stored in the data memory queue to sequentially access the first memory bank whenever the variable latency of each of the plurality of threads passes,
   wherein, when storing of a thread of a second cycle is requested in a state in which storing of threads of a first cycle requested by the functions units is completed, the data memory queue newly stores the thread of the second cycle by erasing a thread with the highest priority from among the threads of the first cycle.

2. The method of claim 1, wherein, in the setting of the variable latency of each of the plurality of threads, the variable latency is set to be a different value for each of the plurality of threads based on the processing timing.

3. The method of claim 2, wherein, in the setting of the variable latency of each of the plurality of threads, the variable latency is set based on a number of stacks of the plurality of threads to be stored in the data memory queue at the determined processing timing and a fixed response time of the first memory bank.

4. The method of claim 1, wherein, in the setting of the variable latency of each of the plurality of threads, the variable latency is set by adding a predetermined field for designating a value of the variable latency to instructions included in the plurality of threads.

5. The method of claim 1, wherein, in the setting of the variable latency of each of the threads, the variable latency is set such that the operation is performed at a point of time when a fixed response time of the first memory bank passes from a point of time when data about each of the threads is requested from the first memory bank.

6. The method of claim 1, wherein the variable latency is set in proportion to a number of bank conflicts to occur by the threads in the first memory bank.

7. The method of claim 1, wherein the performing of the operation comprises:
   checking priorities of the threads that are stored in the data memory queue;
   allowing the threads to sequentially access the first memory bank in a priority order;
   storing processing results of the accessing threads in a reorder buffer; and
   performing the operation by reading out the stored processing results.

8. The method of claim 1, wherein, in the setting of the variable latency of each of the threads, the variable latency is set such that a variable latency of a thread with the lowest priority from among threads of a first cycle that are requested by the function units and a thread with the highest priority from among threads of a second cycle that are requested by the functions units are identical to each other.

9. The method of claim 1, wherein the threads of the function units comprise threads that are generated in a coarse-grained array (CGA) mode.

10. A computer readable recording medium having recorded thereon a program for executing the method defined in claim 1.

11. An apparatus for preventing a bank conflict in a memory, the apparatus comprising:
   a plurality of function units generating a plurality of threads to access a first memory bank;
   a memory controller determining processing timing of each of the threads, wherein said processing timing is time required to access the first memory bank and in said access an occurrence of the bank conflict between at least two of the plurality of function unit is expected and setting a variable latency of each of the plurality of threads for sequential access of the threads to the memory bank according to the determined processing timing; and
   a data memory queue sequentially storing the plurality of threads according to the determined processing timing,
   wherein the memory controller controls performance of an operation by allowing the plurality of threads stored in the data memory queue to sequentially access the first memory bank whenever the variable latency of each of the threads passes, and
   wherein, when storing of a thread of a second cycle is requested by the memory controller, in a state in which storing of threads of a first cycle requested by the functions units is completed, the data memory queue newly stores the thread of the second cycle by erasing a thread with the highest priority from among the threads of the first cycle.

12. The method of claim 1, wherein each of the plurality of threads comprises at least one instruction which has a destination field indicating one of a plurality of memory banks to be accessed, an address field indicating a memory address within said one of the plurality of memory banks, and a latency field designating a value of the variable latency.

13. The method of claim 12, wherein the variable latency is set so as to prevent stalling of the function units as a result of memory bank conflicts and is set in proportion to a number of the bank conflicts occurring in the plurality of memory banks.

14. A method of preventing a bank conflict in a memory, the memory comprising:
  threads of function units to access a first memory bank in which occurrence of a bank conflict is expected;
  setting a variable latency of each of the threads for sequential access of the threads according to the determined processing timing;
  sequentially storing the threads in a data memory queue according to the determined processing timing; and
  performing an operation by allowing the threads stored in the data memory queue to sequentially access the first memory bank whenever the variable latency of each of the threads passes,
  wherein, when storing of a thread of a second cycle is requested in a state in which storing of threads of a first cycle requested by the functions units is completed, the data memory queue newly stores the thread of the second cycle by erasing a thread with the highest priority from among the threads of the first cycle.

15. The apparatus of claim 11, wherein the memory controller sets the variable latency to be a different value for each of the plurality of threads based on the processing timing.

16. The apparatus of claim 11, wherein the memory controller sets the variable latency such that the operation is performed at a point of time when a fixed response time of the first memory bank passes from a point of time when data about each of the threads is requested from the first memory bank.

17. The apparatus of claim 11, wherein the memory controller checks priorities of the plurality of threads that are stored in the data memory queue and allows the plurality of threads to sequentially access the first memory bank in a priority order,
  the apparatus further comprises a reorder buffer that stores processing results of accessing threads from among the plurality of threads; and
  the function units perform the operation by reading out the stored processing results.

18. The apparatus of claim 11, wherein the bank conflict is when said two of the plurality of function unit require said access to the first memory bank at same time.

19. The apparatus of claim 11, wherein, when storing of a thread of a second cycle is requested in a state in which storing of threads of a first cycle requested by the functions units is completed, the data memory queue newly stores the thread of the second cycle by erasing a thread with the highest priority from among the threads of the first cycle.

20. The apparatus of claim 11, wherein, in the setting of the variable latency of each of the threads by the memory controller, the variable latency is set such that a variable latency of a thread with the lowest priority from among threads of a first cycle that are requested by the function units and a thread with the highest priority from among threads of a second cycle that are requested by the functions units are identical to each other.

* * * * *